United States Patent [19]
Adamson

[11] Patent Number: 4,902,590
[45] Date of Patent: Feb. 20, 1990

[54] POLYACRYLIC ADHESIVE

[75] Inventor: David V. Adamson, East Grinstead, United Kingdom

[73] Assignee: Duracell Inc., Bethel, Conn.

[21] Appl. No.: 141,357

[22] PCT Filed: Feb. 23, 1987

[86] PCT No.: PCT/US87/00409
§ 371 Date: Nov. 19, 1987
§ 102(e) Date: Nov. 19, 1987

[87] PCT Pub. No.: WO87/05918
PCT Pub. Date: Oct. 8, 1987

[30] Foreign Application Priority Data

Mar. 7, 1986 [GB] United Kingdom ............... 8607793

[51] Int. Cl.⁴ .................... C08K 5/05; C08L 33/02; H01M 2/14
[52] U.S. Cl. ..................................... 429/94; 429/145; 524/379; 524/522; 525/221
[58] Field of Search ............. 525/221; 524/379, 522; 129/144; 429/254, 145, 94

[56] References Cited

U.S. PATENT DOCUMENTS

| Re. 23,644 | 4/1953 | Grant ................... | 429/144 |
| 3,222,419 | 12/1965 | Jubilee et al. ......... | 525/163 |
| 3,894,889 | 7/1975 | Gillman et al. ........ | 429/144 |
| 4,174,334 | 11/1979 | Bertenshaw et al. .. | 524/405 |
| 4,325,855 | 4/1982 | Dickmann et al. .... | 524/219 |
| 4,424,291 | 1/1984 | Leake et al. .......... | 524/47 |
| 4,477,622 | 10/1984 | Sanderson et al. .... | 524/522 |

Primary Examiner—Allan M. Lieberman
Attorney, Agent, or Firm—Ronald S. Cornell; James B. McVeigh

[57] ABSTRACT

An adhesive system, particularly suitable for the production of laminated separators for alkaline-electrolyte electrochemical cells, comprises a blend of a branched long chain polyacrylic acid with a substantially linear short chain polyacrylic acid, in an organic or aqueous solvent.

8 Claims, No Drawings

POLYACRYLIC ADHESIVE

This invention relates to adhesives, and has particular but not exclusive reference to adhesives to be used for laminating or joining absorbent or porous materials to one another or to other materials.

The adhesive of the invention is particularly applicable to use with absorbent or barrier materials used in electrochemical cells.

Combinations of absorbent papers or non-woven fabrics and barrier materials have been used for some time in electrochemical cells, particularly alkaline-electrolyte cells. For ease of handling and of feeding into the cell during cell assembly, these materials are often laminated together using adhesives or thermal sealing techniques.

In cylindrical cells, particularly alkaline-electrolyte cells, spirally wound tubes of absorbent or barrier material are often used, held in shape by an adhesive applied to lock the overlapping portions of spirals.

The use of adhesive or thermal sealing usually causes blocking of the pores of the absorbent or barrier material. This in turn causes an increase in electrical resistance, and/or a decrease in the electrolyte absorption capacity of the material and a deterioration in the wetting characteristics of the material. As a result the performance of the cell system is impaired.

Attempts have been made to use adhesives which are compatible with alkaline electro-chemical systems and which do not lead to undesirable blocking of the pores of absorbent or barrier materials. Such adhesives have involved the use of gelling agents based on long-chain polyacrylic acids. These have however had serious practical disadvantages. They suffer from extremely high viscosity and poor flow characteristics, so that it is necessary to use specialised coating and lamination machines for applying the adhesives, and specialised equipment to move the adhesive from a holding tank to the adhesive coating head. Because of the high viscosity and poor flow characteristics, the rate of application of these adhesives is low, which reduces the throughput during the lamination operation, thereby increasing overhead costs and significantly increasing the cost of the finished cell.

An object of the present invention is to provide an adhesive system of low viscosity, which can be used on absorbent or porous materials used in alkaline-electrolyte environments without causing pore blockage.

It has been found that an adhesive system of excellent properties can be formed by a blend of a long chain polyacrylic acid with a short chain polyacrylic acid.

The invention can provide an adhesive of relatively low viscosity, capable of being applied by simple equipment and at a high throughput. The adhesive of the invention has electro-chemical properties superior to conventional lamination adhesives and thermal bonding techniques and does not impair the absorption capacity or wetting characteristics of cell absorbent and separator components, but can even improve the wetting properties of laminated alkaline electrolyte cell separators.

The combination of long chain and short chain polyacrylic acids provides an adhesive system with excellent gelling properties combined with low viscosity. Preferably, the long chain polyacrylic acid comprises branched chains whereas the short chain polyacrylic acid comprises substantially linear or only slightly branched chains. Branched long chain polyacrylic acids have excellent gelling and adhesive properties in aqueous or alkaline solutions, but high viscosity. The smaller substantially linear molecules of the short chain polyacrylic acid reside between the long chain molecules and reduce interference between these, acting in effect as a molecular lubricant, with the result that the viscosity of the mixture is sharply reduced, without impairing the gelling and adhesive properties of the long chain polyacrylic acid.

The long chain polyacrylic acid typically has a molecular weight in the range 1,250,000 to 5,000,000, preferably about 3,000,000. Lower molecular weights have inadequate gelling and adhesive properties; higher molecular weights do not readily form suitable solutions.

The short chain polyacrylic acid preferably has a molecular weight in the range 2,000 to 500,000, preferably about 250,000. Polyacrylic acids with materially higher or lower molecular weights do not materially reduce the overall viscosity.

Long chain polyacrylic acids suitable for use in the invention include the "Carbopol" (trademark) range, particularly product Carbopol 941 upwards. Carbopol 934 has been found to be particularly suitable.

The components of the adhesive system of the invention may be dispersed in an aqueous solvent or in a suitable polar organic solvent e.g. methanol, ethanol. Organic solvent systems are usually to be preferred owing to better compatability with the absorbent and barrier materials used in alkaline electrochemical cells; these form fully gelled dispersions and do not rapidly wet the cellulosic material and cause it to swell as occurs when water is used.

The adhesive blend, commonly described as a "dispersion", can be varied considerably in viscosity and flow characteristics, by variation of the ratio between the amounts of long chain and short chain polyacrylic acids and/or their molecular weights, to suit the application technique to be used for applying the adhesive.

A typical lamination system which can be used, comprises a Meyer bar application head with a nip together of the laminated materials whilst still wet, followed by drying e.g. using forced air drying. The use of a solvent facilitates drying at lower temperatures, which can be important with some cell separator systems to avoid damage to the separator materials.

The invention will be further described with reference to the production of laminated separators suitable for use in cylindrical alkaline-manganese cells.

The separator comprises non-woven sheet material, in particular non-woven nylon, laminated to a battery grade regenerated high purity cellulose film.

Such laminates have been prepared using a variety of adhesive systems to form a bond between the two laminate materials, including:
 water based acrylics;
 acrylic copolymers;
 PVA;
 sodium silicate based adhesives;
 thermally bonded adhesives.

Laminates prepared using these adhesive systems have been evaluated with respect to their wet ionic resistance, wetting characteristics, and tendency to delaminate. All of these adhesive systems were found to be inadequate, in particular owing to poor bond strength or to a large increase in the wet ionic resistance of the separator.

An adhesive comprising a dispersion of Carbopol 934 (a long branched chain polyacrylic acid of molecular weight about 3 million) in methanol has been found to be a suitable adhesive in respect of all electrochemical and wetting characteristics, for use in such a separator system. However it cannot easily be used in practice because of its very high viscosity.

The addition of a polyacrylic acid of relatively low molecular weight (preferably about 250,000) to the Carbopol dispersion resulted in an unexpected and considerable decrease in viscosity and a marked improvement in flow characteristics, without any impairment of the electrochemical and wetting characteristics, compared with a separator formed used Carbopol 934 without the added low molecular weight polyacrylic acid. Because of the reduction in viscosity and improved flow characteristics, the adhesive system comprising long chain and short chain polyacrylic acids can be used to produce laminated cell separators using conventional coating and lamination techniques with relatively high throughput.

The improved flow properties are illustrated by the following table.

|  | Brookfield Viscosity (measured at 20 rpm and 20° C.) e.p.s. |
| --- | --- |
| 5% Carbopol 934 in methanol | 11,200 |
| 5% Carbopol 934, 2% polyacrylic acid (PAA) in methanol | 5,900 |
| 5% Carbopol 934, 4% PAA | 4,200 |
| 5% Carbopol 934, 6% PAA | 3,800 |

Comparable results are obtained using other Carbopol long branched chain polyacrylic acids, in combination with other short linear polyacrylic acids. Proportions up to 6 parts PAA to 5 parts Carbopol 934 have been tested; at this value a slight loss of adhesive strength was seen.

I claim:

1. An adhesive system comprising a blend of at least one polyacrylic acid of high molecular weight of between about 1.25 million to 5 million and at least one polyacrylic acid of low molecular weight of between about 2,000 and 500,000, in a solvent; wherein the high molecular weight polyacrylic acid comprises branched chains and the low molecular weight polyacrylic acid comprises substantially linear chains; and wherein the blend comprises amounts of high molecular weight polyacrylic acid and low molecular weight polyacrylic acid in ratios from 1:0.4 to 1:1.2 parts, respectively.

2. An adhesive system according to claim 1 in which the solvent is an organic solvent.

3. An adhesive system according to claim 2 in which the solvent is methanol or ethanol.

4. An adhesive as claimed in claim 1 in which the solvent is an aqueous solvent.

5. A cell separator comprising an absorbent nonwoven sheet material laminated to a barrier material by an adhesive system as set forth in claim 1.

6. An alkaline-electrolyte cell incorporating a separator as claimed in claim 5.

7. A spirally wound separator tube for an electrochemical cell, having its spiral turns adhered by an adhesive system as set forth in claim 1.

8. An alkaline-electrolyte cell incorporating a separator as claimed in claim 7.

* * * * *